Sept. 19, 1967  E. J. DRAGON ET AL  3,343,030
BAR GRAPH OSCILLOSCOPE DISPLAY
Filed July 31, 1964  3 Sheets-Sheet 1

United States Patent Office 3,343,030
Patented Sept. 19, 1967

3,343,030
BAR GRAPH OSCILLOSCOPE DISPLAY
Elbert J. Dragon, Severna Park, Thomas L. Shaffer, Arbutus, and Samuel M. Tucker, Ellicott City, Md., assignors to Westinghouse Electric Corporation, Pittsburgh, Pa., a corporation of Pennsylvania
Filed July 31, 1964, Ser. No. 386,582
12 Claims. (Cl. 315—22)

ABSTRACT OF THE DISCLOSURE

A commutator samples a plurality of input signals, each signal having a discrete amplitude proportional to a parameter being measured. Each time a signal is sampled, deflection voltages are produced to deflect the cathode ray beam of a cathode ray tube in a plurality of parallel columns. The input signals sampled are converted to respective pulse width signals of all the same amplitude, but each being of a width proportional to the amplitude of a corresponding input signal. The pulse width signals are then utilized to turn on the cathode ray beam as it is swept in the plurality of columns.

A marker generator provides a marker pulse signal which is utilized to generate a plurality of marker dots in each column represented.

---

This invention in general relates to data analysis systems, and more in particular to a bar graph oscilloscope display for relatively displaying a plurality of signals on the cathode ray tube of a cathode ray oscilloscope display apparatus.

In the field of data analysis, it is often desirable to compare the amplitudes of a plurality of signals generally falling within a predetermined voltage range, with each signal being representative of for example, a physical quantity of a system. By way of example, pressure sensitive means may be located within a system to obtain relative pressures at various points in the system. In other applications it is often desired to display signals representative of other physical properties such as temperature, pressure, resistance, angular measurement, to name a few, and to this end bar graph oscilloscopes are widely utilized.

Signals representing the physical properties being measured are generally converted to a corresponding signal, the amplitude of which is proportional to the quantity being measured and wherein a predetermined voltage, for example 5 volts, represents 100% of the full range value being measured. The signals are then sequentially sampled by means of a commutator device which sequentially applies the amplitude signal to the vertical deflection plate of a cathode ray tube. The cathode ray tube has its cathode ray beam sweeping in a horizontal direction along a base line and each time the commutator samples an input signal, the cathode ray beam will be displaced in a vertical direction. The scanning rate of the commutator is such that each of the input signals causes a corresponding vertical displacement of the horizontally sweeping cathode ray beam, with the vertical displacement being controlled by the amplitude of the signal being sampled. Since the sampling of the input signals occurs at a constant rate, the time for displaying each signal sampled is the same. With this mode of operation, a relatively large amplitude input signal causes a vertical deflection of the horizontally sweeping beam to have a relatively light trace on the face of the cathode ray tube whereas a relatively low amplitude signal causes a more intense trace on the face of the cathode ray tube since a shorter distance is to be covered in the same period of time. This tends to cause a reduction in the useful life of the cathode ray tube. Since the cathode ray beam is constantly being swept in a horizontal direction, used as the base line, the cathode ray tube tends to burn out, with some systems requiring a replacement every few months.

It is therefore a primary object of the present invention to provide bar graph oscilloscope apparatus which greatly prolongs the life of the cathode ray tube utilized.

Another object is to provide an improved system for relatively displaying signals on a cathode ray tube wherein the trace of the cathode ray beam is of constant intensity for all signals displayed.

A further object is to provide a bar graph oscilloscope system which eliminates the need of a base line sweep on the cathode ray tube utilized.

In many bar graph oscilloscope applications, numerical values for the relatively displayed signals are desired and to this end various overlays or templates are placed on the face of the cathode ray tube. The use of these templates necessitates the utilization of a plurality of templates having different calibrations thereon for different desired applications.

Another object of the present invention is to provide a bar graph oscilloscope system having a "built-in" calibrating, or marker, scale.

Another object of the present invention is to provide a bar graph oscilloscope system having a built-in marker scale which may be adjusted to provide different calibrations.

Yet another object is to provide a bar graph oscilloscope system which has a marker or calibration system synchronized with the input signals being sampled.

Briefly, in accordance with the above objects, the broad concept of the invention comprises means for sampling a plurality of input signals to be relatively displayed on cathode ray tube indicator means and gating the cathode ray beam of the cathode ray tube on, for a length of time proportional to the amplitude of the input signal sampled while vertically sweeping the cathode ray beam in a plurality of columns at a constant velocity, each column being representative of a respective input signal. The objects, and the basic concepts, are accomplished in the present invention, one illustrative embodiment of which comprises commutator means for sampling input signals and means for obtaining a plurality of pulse signals each having a width proportional to a corresponding one of the input signals sampled. Stair-step generator means are provided to sweep the cathode ray beam of a cathode ray tube in a first, or horizontal direction with each successive step of the waveform being initiated each time a new input signal is sampled. Means are provided for sweeping the cathode ray beam in a second, or vertical direction each time an input signal is sampled, with the sweep being of a constant velocity and means for applying the pulse signals having a width proportional to a corresponding one of the input signals to the grid of the cathode ray tube to govern the intensity of the display on the face of the tube.

An additional feature of the present invention is the provision of a marker generator means for providing a plurality of marker pulses which are combined with the pulse signals to govern the intensity of the display thereby resulting in a "built-in" calibration chart. By adjusting the frequency of the marker generator output signal, different calibrations may be displayed on the face of the cathode ray tube.

The above stated, as well as further objects will become more clearly apparent upon a reading of the following detailed specification taken in conjunction with the drawings, in which.

Figure 1:
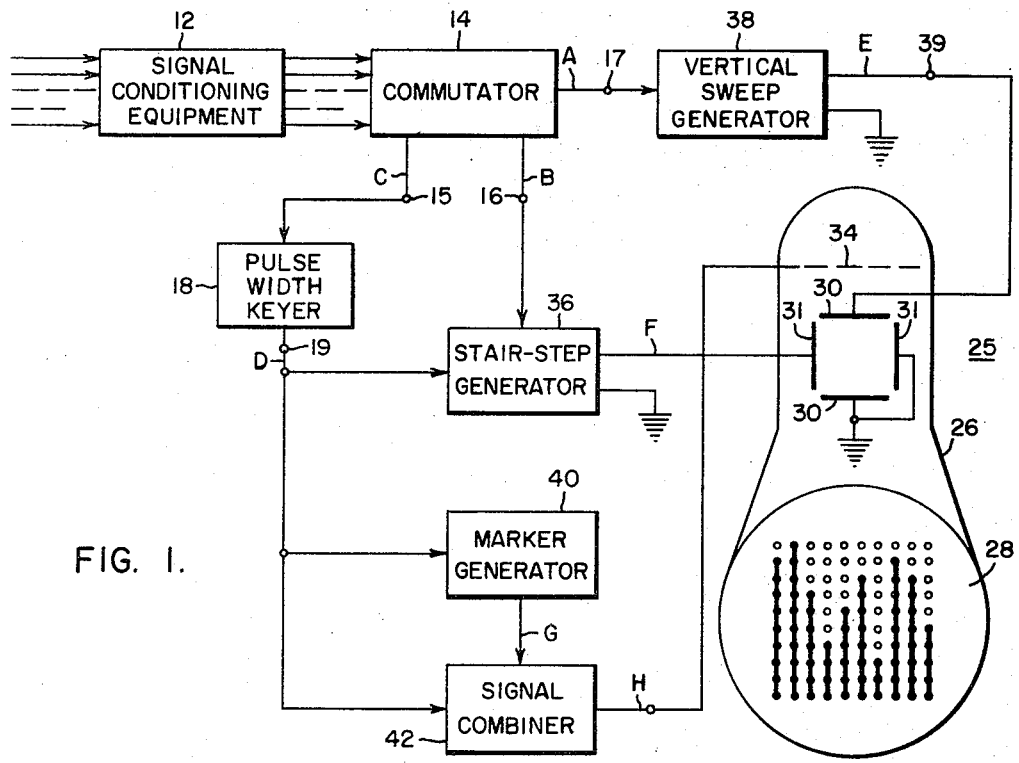
FIGURE 1 illustrates a preferred embodiment of the present invention.

Referring now to FIG. 1, signal conditioning equipment 12 is operable to receive a plurality $n$ of input signals representing for example some physical quantity or quantities being measured. The signal conditioning equipment 12 in response to the input signals converts each signal to a pulse amplitude modulated signal falling within a predetermined voltage range. In order to sample the input signals so converted, there is provided commutator means 14 preferably in the form of an electronic commutator which scans and samples the input signals in a sequential manner. The operation of the commutator 14 is such that each time an input signal is sampled an output pulse will appear at terminal 17, and each time all of the input signals are sampled a pulse will appear at terminal 16. It follows therefore that the frequency of the pulses appearing at terminal 17 is an indication of the rate of sampling of the input signal, and the waveform designated A, to be hereinafter described with respect to FIG. 2, will be termed the clock signal, and the waveform B appearing at terminal 16 will be termed the sync signal. Means are provided to pulse width modulate the input signal, which means takes the form of the pulse width keyer 18, the keyer being responsive to the sampled signal appearing at terminal 15 to provide pulse width modulated signals at terminal 19 with each signal produced having a width proportional to a corresponding one of the input signals. The pulse width keyer 18 of the embodiment of the invention shown in FIG. 1 produces a plurality of equal amplitude pulse width modulated signals each proportional to the amplitude of a corresponding input signal.

The cathode ray oscilloscope display generally designated by the numeral 25 includes a cathode ray tube 26 having a viewing, or display screen 28. Cathode ray tube 26 is of the well known variety and includes vertical deflecting plates 30, horizontal deflecting plates 31 and a control grid 34 which is the control grid for the cathode ray beam of the tube 26.

Since a plurality of input signals are to be relatively displayed on the display screen 28 of the cathode ray tube 26, means are provided to vertically sweep the cathode ray beam in a plurality of columns, each column therefore being associated with a corresponding input signal. To vertically sweep the cathode ray beam each time an input signal is sampled, the vertical sweep generator 38 is responsive to the clock signal appearing at terminal 17 to provide an output sawtooth waveform designated E. Each clock pulse appearing at terminal 17 triggers one sawtooth cycle of the vertical sweep generator 38. To deflect the cathode ray beam in a horizontal direction, there is provided a stair step generator 36 which provides successively higher steps with each step being initiated with each input signal sampled. Since the signal appearing at terminal 19 of the pulse width keyer 18 is indicative of the input signals being sampled, the stair step generator 36 will be successively triggered in its operation by the pulses appearing at terminal 19 and will be reset back to its initial voltage level by the sync signal appearing at terminal 16 to start the cycle over again.

The sawtooth waveform appearing at terminal 39 of the vertical sweep generator 38 is shown to be connected directly to the vertical deflection plates 30 and the input signal from the stair step generator 36 is shown as being directly connected to the horizontal deflection plate 31. It is to be understood that the output signals from these generators may be fed to suitable amplifiers before being applied to the deflection plates.

In order to provide a display having calibration marks, on the display screen 28, there is provided a marker generator 40 for providing a marker signal comprising a plurality of pulses preferably having a greater frequency than the rate of sampling of the input signals. In order to better synchronize the marker generator 40 so that the calibration marks resulting therefrom on the display screen 28 are relatively even and symmetrical, the marker generator 40 is made responsive to the output of the pulse width keyer 18 and is reset at the beginning of each pulse emanating therefrom. Signal combiner means 42 combines the output signal from the pulse width keyer 18 and the marker signal from the marker generator 40 for providing a signal to govern the intensity of the ultimate display. This is accomplished by feeding the output signal from the signal combiner 42 to the grid 34 of the cathode ray tube 26. For a better understanding of the operation of the embodiment shown in FIG. 1, reference should now be made to FIG. 2 which shows waveforms A through H appearing at various points correspondingly labeled in FIG. 1.

For purposes of explanation it will be assumed that the number $n$ is ten, and that the rate of sampling is such that at time $T_1$ the first input signal is sampled, at $T_2$ the second input signal is sampled, at $T_3$ the third input signal sampled, etc. Waveform A of FIG. 2 therefore shows the clock pulses produced each time an input signal is sampled. Each of the pulses, and the pulses in the other waveforms, have a leading edge labeled $l$ and a trailing edge $t$. The sync pulse shown in waveform B occurs every time all of the $n$ (in the present example ten) input signals are sampled and it is seen that one sync pulse is provided for every ten clock pulses. Waveform C represents the input signal sampled at times $T_1$, $T_2$, etc., and waveform C demonstrates that the amplitudes of the input signals may vary. Waveform D which is the output of the pulse width keyer 18 comprises a plurality of equal amplitude pulses with each pulse having a width proportional to a corresponding pulse shown in waveform C. Although the time between samplings remains constant the width of each pulse in waveform D will vary, with the maximum width (in time) preferably being less than a complete interval between samplings. Waveform E illustrates the sawtooth vertical sweep waveform with each linearly increasing voltage being initiated by each sampling, as represented by the pulses in waveform A. In actuality the vertical sweep generator 38 may be the horizontal sweep generator of a standard oscilloscope and which may be modified and rearranged to be connected to the vertical deflection plates of the cathode ray tube in the oscilloscope. Each time an input signal is sampled, the stair step generator 36 provides an output stair step waveform F, with each successive step being initiated with each successive sampling of an input signal. As shown at $T_1$ a stair step waveform is reset back to its initial value which resetting is caused by the sync pulse of waveform B. Each horizontal plateau of the waveform F represents a unique column position of the cathode ray beam on the display screen 28 (FIG. 1) with the vertical separation between each plateau, or step, governing the separation between the displayed columns. Waveform G represents the pulse train provided by the marker generator 40 and waveform H represents the combined pulse width modulated signal of curve D and the marker signal of curve G, as provided by the signal combiner 42. In the present example the number of inputs are ten and a typical rate of sampling may be 1000 samples per second. The clock pulse waveform A therefore has a frequency of 1000 pulses per second and the time between each pulse will therefore be 1 millisecond.

The time between leading edges of the pulses in waveforms C and D are therefore 1 millisecond apart. Since the sync signal shown in waveform B occurs each time a complete set of the input signals have been sampled the frequency thereof will be 1000 divided by ten or 100 times per second. Since a new step is generated in the stair step waveform F each time an input signal is sampled the frequency thereof will be 1000 steps per second while the sync signal resets it at 100 times per second thereby resulting in ten successively increasing steps corresponding to the ten input signals. The frequency of the waveform G may be adjusted to a desired frequency, the frequency shown being 10 times the frequency of the clock signal.

Figure 2:
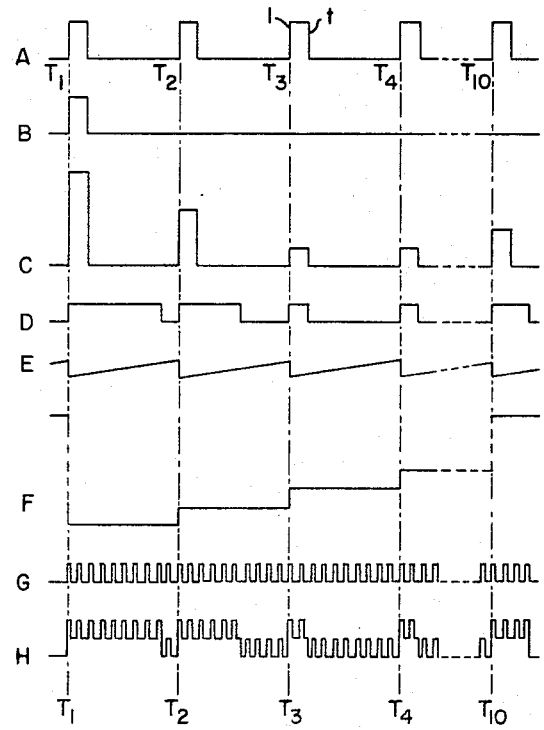
FIG. 2 illustrates various waveforms appearing in the system of FIG. 1, to aid in an understanding of the present invention.
Figure 3:
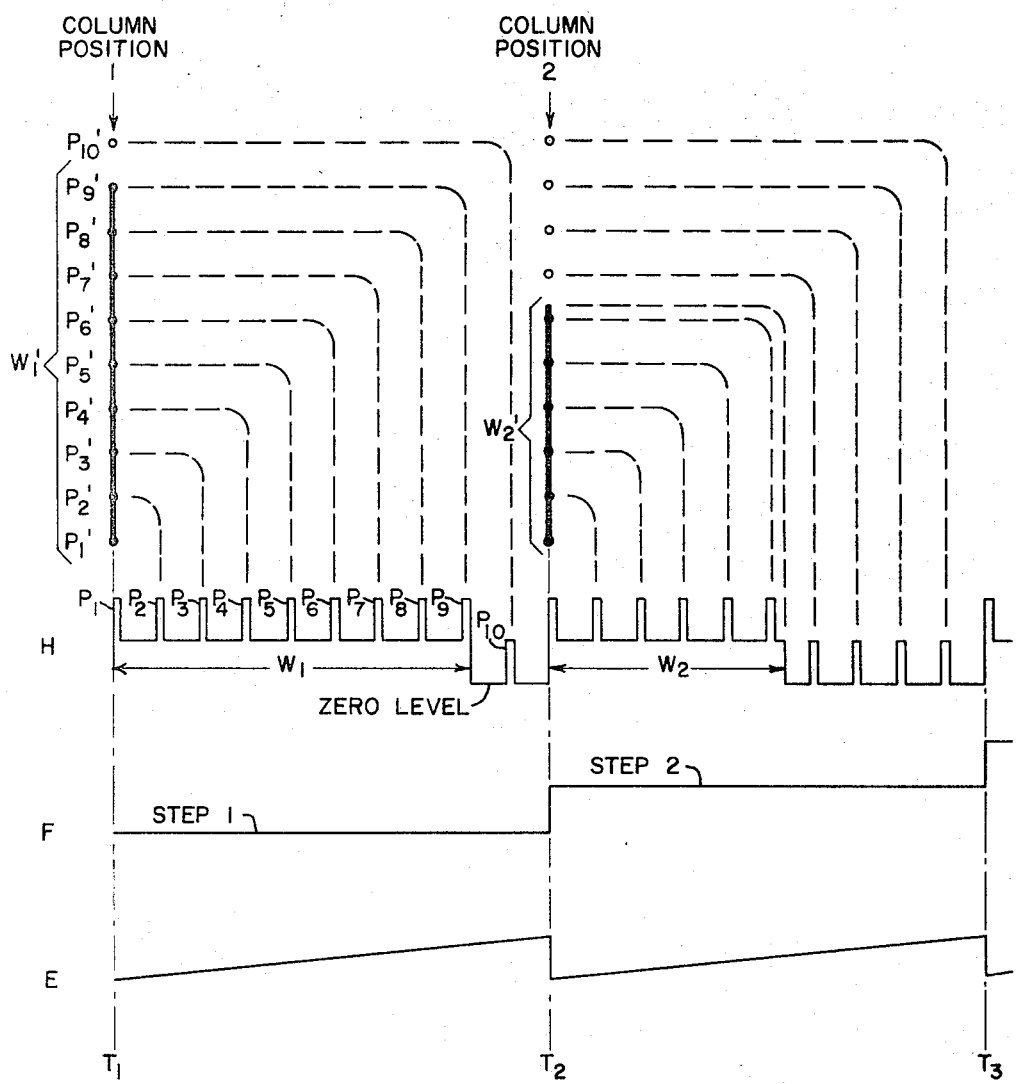
FIG. 3 illustrates in more detail some of the waveforms of FIG. 2 and the relation thereof to the cathode ray tube display.

FIG. 3 shows in somewhat more detail the relationship between some of the waveforms of FIG. 2 and the final display on the display screen 28 of the cathode ray tube 26. In FIG. 3, three waveforms E, F and H are shown corresponding to the period from time $T_1$ to $T_2$ and from $T_2$ to $T_3$, each period in the present example being 1 millisecond. The voltage level of step 1 of waveform F insures that the sawtooth waveform E sweeps the cathode ray beam vertically in column position 1, shown above waveform H and representing the first column on display screen 28. Waveform H is applied to grid 34 and is operable to gate the cathode ray beam on and off. When the waveform is at the zero level shown, the cathode ray beam will be gated off and when the waveform H is above the zero level, the cathode ray beam will be gated on. Since each of the marker pulses $P_1$ to $P_{10}$ are above the zero level each will gate the electron beam on to produce a corresponding spot, or dot, $P'_1$ to $P'_{10}$ in the vertical display. In addition, the input signal sampled at time $T_1$ has produced a corresponding pulse width modulated pulse having a width $W_1$ in waveform H which insures, that the cathode ray beam is on for that corresponding period of time thus producing a vertical line $W_1'$ in column position 1. After the information in column 1 has been displayed, waveform F increases to the step 2 voltage level to display input signal number 2 in column position 2. The displacement of column 2 from column 1 is dependent upon the voltage difference between step 2 and step 1. From time $T_2$ to $T_3$ the marker pulses, as was explained, will produce a corresponding marker dot on the display screen in column position 2 and the input signal which produced a pulse width modulated pulse having a width $W_2$ gates the cathode ray beam on for a corresponding period of time to produce the vertical line $W_2'$ of column 2. The same general scheme is followed until all of the ten input signals have been displayed whereafter the horizontal positioning waveform F drops back to the voltage level of step 1 to again display input signal number 1 in column position 1. The number of calibrating dots in each column may be varied simply by varying the frequency of the marker generator 40 to produce more or fewer pulses per sampling time. The height of the vertical sweep for each column may be varied by varying the slope of the sawtooth waveform E and the number and distance between columns displayed may be varied by varying the stair step waveform F, generally in accordance with the number of input signals to be sampled.

When the marker generator is being used to provide calibration dots it is desirable that the first dots, second dots, etc., of all the columns be displayed symmetrically such that the first dots begin at the same horizontal level and the last dots end at the same horizontal level, with the marker dots therebetween being substantially equally spaced. In order to insure such a symmetrical display, it is necessary to employ an extremely accurate pulse generator to be used as the marker generator 40. As an alternative, the marker generator may be synchronized with the incoming signals such that the marker generator 40 is reset to provide its pulse train each time a new signal is to be displayed. For a circuit realization of the marker generator 40 as well as a circuit realization of the embodiment of the invention shown in FIG. 1, reference should now be made to FIG. 4.

Figure 4:
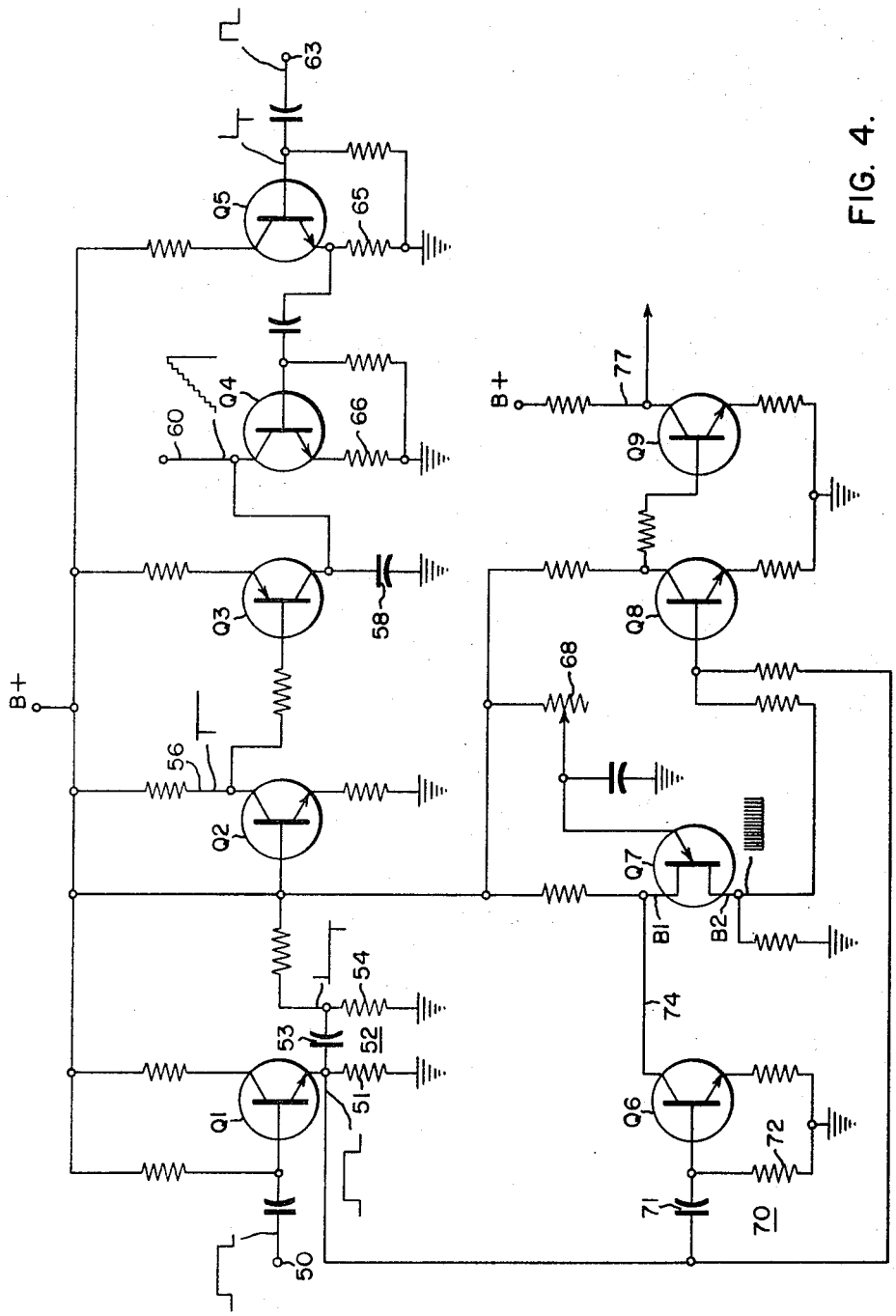
FIG. 4 illustrates a circuit realization of the embodiment of the invention shown in FIG. 1.

FIG. 4 illustrates a transistorized version of an operative system to perform the functions as exemplified with respect to FIG. 1.

In FIG. 4 transistors Q1, Q2, Q3, Q4 and Q5 suitably connected to a source of positive potential B+, are utilized to generate and reset the stair step waveform F. The pulse width signals from the pulse width keyer 18 (FIG. 1) are fed to emitter follower transistor Q1 at input terminal 50. The pulse width signal is reproduced at the emitter of transistor Q1 across resistor 51 and is differentiated by differentiator 52 including capacitor 53 and resistor 54 to obtain a positive spike corresponding to the leading edge of the pulse and a negative spike corresponding to the trailing edge of the pulse. The positive spike is amplified and inverted by transistor Q2 and fed to transistor Q3 which when pulsed on allows current to flow to thereby place a charge on capacitor 58. As the pulses are received at input terminal 50, the leading edges thereof are an indication of successive samplings of the input signals to be displayed. Since each leading edge represents a new signal being sampled, and since each leading edge causes transistor Q3 to place a charge on capacitor 58, the output voltage across capacitor 58 which appears on output lead 60 is a stair step waveform with each successive step being provided in accordance with each successive input signal sampled. After an entire set of input signals has been sampled, a sync signal is provided at terminal 63 causing transistor Q5 to conduct, the signal appearing at the emitter thereof across resistor 65 being coupled to transistor Q4 thereby turning it on and affording a discharge path for the charge on capacitor 58 through transistor Q4, through resistor 66 to ground thereby in effect resetting the stair step waveform back to its initial voltage level. The output voltage therefore on lead 60 is utilized to govern the horizontal sweep of the cathode beam of the cathode ray tube 26.

In order to provide the marker pulse waveform G as shown in FIG. 2, there is provided a marker generator in the form of a unijunction transistor Q7 having two bases B1 and B2 and being of the type wherein the frequency of oscillation thereof may be varied by an adjustment of variable resistor 68. The frequency of oscillation is preferably greater than the rate of sampling of the input pulses and in the present case the frequency of oscillation is ten times greater. The pulses thus produced appear at base B2. Means are provided to synchronize the oscillation of unijunction transistor Q7 in accordance with the sampling of input pulses, the means taking the form of transistor Q6. Differentiator 70 comprising capacitor 71 and resistor 72 receives the output signal from the emitter of transistor Q1 to provide a positive and negative spike corresponding to the leading and trailing edges of the pulse width modulator pulse as heretofore explained. Transistor Q6 amplifies and inverts the positive spike which is applied to base B1 of unijunction transistor Q7 to reset it thereby effecting a synchronization of the marker generator with each signal to be displayed. The marker pulses and the pulse width signal appearing at the emitter of transistor Q1 are combined in the signal combining means comprising transistor Q8, the output signal of which is amplified by transistor Q9, suitably biased from a source of positive potential B+. The output signal appearing at collector 77 of transistor Q9 is therefore waveform H of FIG. 2 which is utilized to gate the cathode ray beam of the cathode ray tube 26 on and off. In an alternative method of operation the bias on unijunction transistor Q7 may be adjusted such that no marker pulses are provided and a bar graph pattern will be displayed on the display screen 28 without any marker dots.

Although the present invention has been described with a certain degree of particularity, it is to be understood that various modifications may be made. By way of example the stair step generator provides successively increasing steps in response to the leading edges of the pulses emanating from the pulse width keyer. Other arrangements may be provided wherein the stair step generator may be made responsive to the clock pulse provided by

What is claimed is:

1. A system for relatively displaying a plurality of input signals on the cathode ray tube of a cathode ray oscilloscope display comprising:
means for sampling said input signals;
means for vertically sweeping the cathode ray beam of said cathode ray tube, in a plurality of columns; and
means for gating the said beam on for a length of time proportional to the amplitude of said input signals sampled.

2. A system for relatively displaying a plurality of input signals on a cathode ray tube display comprising:
means for sampling said input signals for obtaining a plurality of pulse signals, each having a width proportional to a corresponding one of said input signals;
means responsive to the sampling of each said input signal for providing first and second direction sweep signals for the electron beam of said cathode ray tube display; and
means for applying said pulse signals to said cathode ray tube display for governing the intensity of said electron beam.

3. A system for relatively displaying a plurality of input signals on a cathode ray tube display comprising:
means for sequentially sampling said input signals for obtaining a plurality of pulse signals each having a width proportional to a corresponding one of said input signals;
first sweep generator means for providing a stair step waveform to sweep the electron beam of said cathode ray tube display in a first direction and being resettable after a complete sampling cycle of all of said input signals to be displayed;
means responsive to the sampling of each said input signal to sweep said electron beam in a second direction at a constant velocity; and
means for applying said pulse signals to said cathode ray tube display for governing the intensity of said electron beam.

4. A system for relatively displaying a plurality of input signals on a cathode ray tube display comprising:
commutator means for periodically scanning said input signals;
pulse width modulating means responsive to said scanned signals for deriving pulse signals the width of each being proportional to a corresponding one of said input signals;
sweep generator means for providing a stair-step waveform with each successive step being produced each time an input signal is scanned, for governing the horizontal sweep of said cathode ray tube;
marker generator means for providing a marker signal having a frequency greater than the rate of scanning of said input signals; and
signal combining means responsive to said pulse signals and said marker signal for obtaining a display signal for governing the display on said cathode ray tube.

5. A system for displaying the relative amplitudes of a plurality of input signals on a cathode ray tube of a cathode ray oscilloscope comprising:
pulse width modulator means;
scanning means for repetitively sampling each said input signal and applying it to said pulse width modulator means to obtain a plurality of pulse width modulated signals;
means for obtaining a clock signal each time an input signal is sampled and a sync signal each time said plurality is sampled;
generator means for providing a marker signal having a frequency greater than the frequency of said clock signal;
means for obtaining a stair-step horizontal sweep signal for said cathode ray tube and having a step frequency equal to said clock signal frequency and resettable in accordance with the frequency of said sync signal;
means for obtaining a vertical sweep signal for said cathode ray tube and having a frequency equal to said clock signal frequency; and
means for combining said pulse width modulated signals and said marker signal for obtaining a display intensity signal for said cathode ray tube.

6. A system for displaying the relative amplitudes of a plurality of input signals on a cathode ray tube of a cathode ray oscilloscope comprising:
means for receiving and sequentially scanning of input signals each having an amplitude within a predetermined voltage range for obtaining a plurality of equal amplitude pulse modulated signals each having a pulse width governed by the amplitude of a corresponding input signal;
the frequency of said pulse modulated signals being equal to the scanning rate of said input signals;
a stair-step generator responsive to the leading edges of said pulse modulated signals for providing $x$ successively higher voltage levels for governing the horizontal sweep of said cathode ray tube and being resettable after every $n$ scans;
means for governing the vertical sweep of said cathode ray tube in accordance with said scanning rate; and
means for applying said pulse modulated signals to said cathode ray tube for controlling the intensity of the display thereon.

7. The method of relatively displaying a plurality of signals, each having an amplitude within a vertain voltage range, on a cathode ray tube of a cathode ray oscilloscope comprising the steps of:
sequentially sampling each said signal;
converting said signals to corresponding pulse width modulated signals;
vertically sweeping the cathode ray beam of the cathode ray tube in a plurality of parallel columns; and
gating said beam on only for time durations corresponding to the width of said pulse width modulated signals.

8. The method of relatively displaying a plurality of signals, each having an amplitude within a certain voltage range, on a cathode ray tube of a cathode ray oscilloscope comprising the steps of:
sequentially sampling each said signal;
converting said signals to corresponding pulse width modulated signals;
vertically sweeping the cathode ray beam of the cathode ray tube in a plurality of parallel columns;
generating a marker pulse train;
combining said pulse width modulated signals and said pulse train to obtain a control signal; and
gating said beam on in accordance with said control signal.

9. The method of relatively displaying a plurality of signals each having an amplitude within a certain voltage range, on a cathode ray tube of a cathode ray oscilloscope comprising the steps of:
sequentially sampling each said input signal;
converting each said signal to a proportional pulse width modulated signal;
providing a clock pulse with each sampling of an input signal;
vertically sweeping the cathode ray beam of the cathode ray tube in accordance with the frequency of said clock pulses;
generating a stair-step waveform, with each successive step being provided as an input signal is sampled;
horizontally sweeping the cathode ray beam of the cathode ray tube with said stair-step waveform;
generating a marker signal;

adding said marker signal and said pulse width modulated signal and applying the combined signal resulting therefrom to control the intensity of said cathode ray beam.

10. Apparatus for relatively displaying a plurality of input signals on the cathode ray tube of a cathode ray tube display, comprising:
   means for sequentially sampling said input signals, at a predetermined rate, for obtaining a plurality of pulse width modulated signals each having a width proportional to a corresponding one of said input signals;
   means for generating first and second direction sweep signals for the cathode ray beam of said cathode ray tube;
   oscillator means for providing a marker pulse train having a frequency greater than said predetermined rate;
   means for synchronizing said oscillator means to provide said pulse train each time an input signal is sampled; and
   means for combining said pulse train and said pulse width modulated signals to derive a display intensity signal for the control grid of said cathode ray tube.

11. Apparatus for relatively displaying a plurality of input signals on the cathode ray tube of a cathode ray oscilloscope comprising:
   commutator means for sampling said input signals;
   modulator means for deriving pulse signals; each having a leading and trailing edge and having a width proportional to a corresponding one of said input signals;
   means responsive to the operation of said commutator means for providing a clock signal comprising a plurality of pulses each having a leading and trailing edge and each being provided each time an input signal is sampled;
   means for vertically sweeping the cathode ray beam of said cathode ray tube;
   means for generating a horizontal sweep voltage to displace the vertically swept cathode ray beam a predetermined distance each time one of said input signals is sampled;
   marker signal oscillator means for providing a marker signal and resettable in response to the leading edge of the pulses of a predetermined one of said signals having pulses; and
   means for simultaneously displaying said pulse signals and said marker signal on said cathode ray tube.

12. Bar graph oscilloscope apparatus comprising:
   a cathode ray tube having a control grid, vertical and horizontal deflection means;
   electronic commutator means for receiving $n$ input signals and operable to sequentially scan said input signals at a frequency $f$ for providing sequential output signals;
   a pulse width keyer responsive to the output signals from said commutator means for providing pulse signals each having a width proportional to the amplitude of a corresponding one of said input signals;
   means for providing a clock signal having a frequency $f$;
   means for providing a sync signal having a frequency $f/n$;
   stair-step generator means having a frequency $f$ and resettable by said sync signal, operatively connected to said horizontal deflection means for governing the horizontal sweep of the electron beam of said cathode ray tube;
   means responsive to said clock signal for providing a saw-tooth waveform to said vertical deflection means for governing the vertical sweep of the deflection beam of said cathode ray tube;
   adjustable oscillator means for providing a marker signal having a frequency of $kf$, where $k>1$; and
   means for combining said marker signal and the output signals from said pulse width key for obtaining an intensity control signal for said control grid of said cathode ray tube.

References Cited
UNITED STATES PATENTS

| | | | |
|---|---|---|---|
| 2,848,648 | 8/1958 | Wolcott | 315—26 |
| 3,130,346 | 4/1964 | Callick | 315—30 X |

JOHN W. CALDWELL, *Acting Primary Examiner.*

DAVID G. REDINBAUGH, *Examiner.*

T. A. GALLAGHER, J. A. O'BRIEN,
*Assistant Examiners.*